(12) United States Patent
Ericson

(10) Patent No.: US 9,980,004 B1
(45) Date of Patent: May 22, 2018

(54) DISPLAY LEVEL CONTENT BLOCKER

(71) Applicant: PayPal, Inc., San Jose, CA (US)

(72) Inventor: Braden Christopher Ericson, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days. days.

(21) Appl. No.: 15/638,731

(22) Filed: Jun. 30, 2017

(51) Int. Cl.
*H04N 7/16* (2011.01)
*H04N 21/454* (2011.01)
*H04N 21/431* (2011.01)
*G06K 9/62* (2006.01)
*H04N 21/475* (2011.01)

(52) U.S. Cl.
CPC ....... *H04N 21/4542* (2013.01); *G06K 9/6209* (2013.01); *H04N 21/4318* (2013.01); *H04N 21/4755* (2013.01)

(58) Field of Classification Search
CPC ........... H04N 21/4542; H04N 21/4318; H04N 21/4755
USPC ......................................................... 725/25
See application file for complete search history.

(56) References Cited

U.S. PATENT DOCUMENTS

| | | | | |
|---|---|---|---|---|
| 6,072,520 A * | 6/2000 | Yuen | ..................... | G11B 27/107 348/569 |
| 6,112,186 A * | 8/2000 | Bergh | ............... | G06F 17/30699 705/14.37 |
| 6,115,057 A * | 9/2000 | Kwoh | .................... | H04H 60/48 348/460 |
| 6,226,793 B1 * | 5/2001 | Kwoh | .................... | H04H 60/12 348/E5.105 |
| 6,388,700 B1 * | 5/2002 | Beyers | ............... | H04N 5/44513 348/465 |
| 6,662,365 B1 * | 12/2003 | Sullivan | ............... | H04N 5/4401 348/E5.105 |
| 6,684,240 B1 * | 1/2004 | Goddard | ............... | H04N 7/163 348/E7.061 |
| 7,089,576 B1 * | 8/2006 | Lynch | .................... | H04N 7/165 348/E7.063 |
| 7,210,158 B1 * | 4/2007 | Forler | .................... | H04N 7/163 725/31 |
| 7,313,803 B1 * | 12/2007 | Lynch | .................... | H04N 7/163 348/E7.061 |
| 7,430,360 B2 * | 9/2008 | Abecassis | .............. | G11B 19/02 348/E5.105 |
| 7,739,706 B2 * | 6/2010 | Gonzales-Caiazzo | | H04N 5/44513 725/25 |

(Continued)

*Primary Examiner* — Michael B Pierorazio
(74) *Attorney, Agent, or Firm* — Maschoff Brennan

(57) ABSTRACT

According to an aspect of an embodiment of the present disclosure, operations related to display level content blocking may include obtaining pixel data of a screen image intended for presentation on a display. The operations may further include, prior to presenting the screen image on the display: identifying particular content in the screen image based on the pixel data; identifying, in the pixel data, content-pixel data that is a portion of the pixel data that corresponds to the identified particular content; and modifying the content-pixel data to obscure presentation of the particular content. In addition, the operations may include causing presentation of the screen image on the display based on the modified content-pixel data such that presentation of the particular content is obscured in the presentation of the screen image.

20 Claims, 4 Drawing Sheets

(56) References Cited

U.S. PATENT DOCUMENTS

| | | | | |
|---|---|---|---|---|
| 7,950,032 | B1* | 5/2011 | Lynch | G11B 27/107 |
| | | | | 348/460 |
| 8,225,345 | B2* | 7/2012 | Sahasrabudhe | G06F 21/35 |
| | | | | 725/28 |
| 8,850,469 | B1* | 9/2014 | Yang | H04N 21/25841 |
| | | | | 725/135 |
| 2005/0028191 | A1* | 2/2005 | Sullivan | H04N 5/4401 |
| | | | | 725/28 |
| 2006/0064733 | A1* | 3/2006 | Norton | G11B 19/025 |
| | | | | 725/135 |
| 2007/0033610 | A1* | 2/2007 | Sohn | H04N 5/44543 |
| | | | | 725/28 |
| 2007/0143778 | A1* | 6/2007 | Covell | G06F 17/30743 |
| | | | | 725/19 |
| 2007/0150916 | A1* | 6/2007 | Begole | H04H 60/31 |
| | | | | 725/10 |
| 2007/0204288 | A1* | 8/2007 | Candelore | H04N 5/4401 |
| | | | | 725/28 |
| 2008/0145025 | A1* | 6/2008 | Wimberly | G06F 17/30038 |
| | | | | 386/261 |
| 2009/0080852 | A1* | 3/2009 | Peters | G11B 27/105 |
| | | | | 386/248 |
| 2009/0089827 | A1* | 4/2009 | Carlsgaard | H04N 7/163 |
| | | | | 725/28 |
| 2009/0089828 | A1* | 4/2009 | Carlsgaard | H04N 7/163 |
| | | | | 725/28 |
| 2013/0326561 | A1* | 12/2013 | Pandey | G11B 27/031 |
| | | | | 725/58 |
| 2014/0007150 | A1* | 1/2014 | Bhide | H04N 21/454 |
| | | | | 725/14 |

* cited by examiner

DISPLAY LEVEL CONTENT BLOCKER

FIELD

Embodiments of the disclosure relate to a display level content blocker.

BACKGROUND

In some instances, users that are consuming media on an electronic device may want certain types of content to be blocked. For example, users may desire to have content that may be objectionable to the users (e.g., advertisements, nudity, sexual content, violent content, gore, drugs, tobacco, alcohol, profanity, etc.) blocked.

BRIEF DESCRIPTION OF THE DRAWINGS

Example embodiments will be described and explained with additional specificity and detail through the use of the accompanying drawings in which.

DETAILED DESCRIPTION

Figure 1:
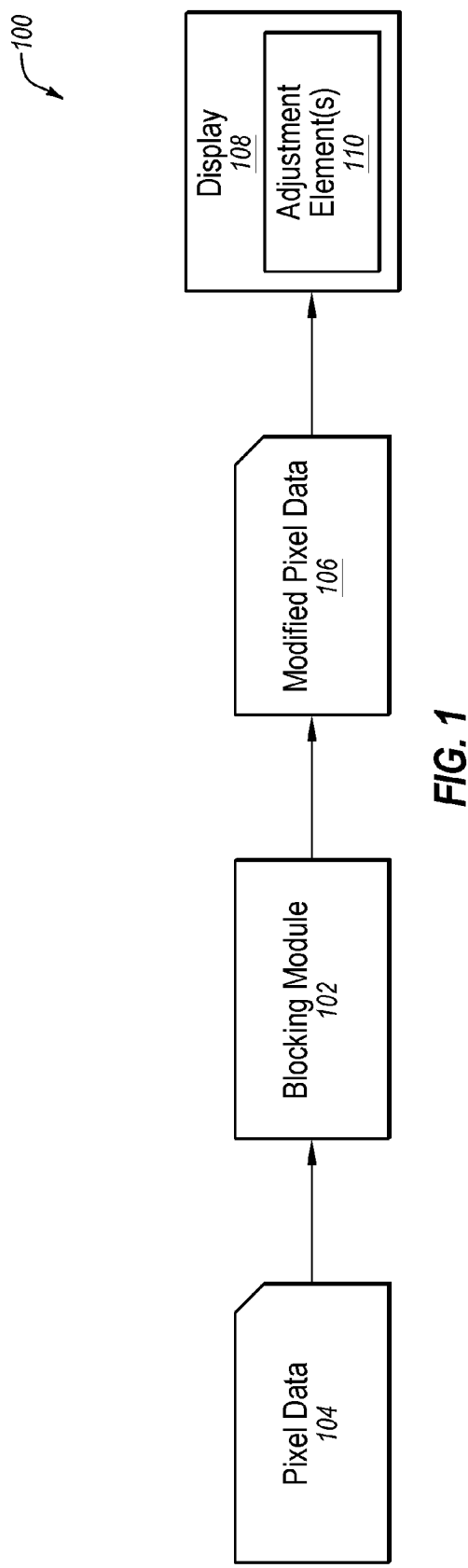
FIG. 1 is a diagram illustrating an example system that may be used to block a presentation of content on a display of an electronic device.

According to one or more embodiments of the present disclosure, the presentation of content on a display may be blocked. In some embodiments, the presentation of the content may be blocked at the display level. For example, in some embodiments, pixel data of a screen image may be obtained. The screen image may be intended for presentation on a display and may include one or more elements. For instance, the screen image may include a complete arrangement of all the elements that may be presented on the display. The elements may include words, shapes, drawings, images, etc., with varying sizes, colors, etc. In some embodiments, the pixel data may include information (e.g., color, brightness, etc.) that may direct the emission of light by pixels of the display to present the screen image on the display.

In some embodiments, particular content in the screen image may be identified based on the pixel data prior to presenting the screen image on the display. In some instances, the particular content may include content that the user has designated as objectionable, such as advertisements, nudity, sexual content, violent content, gore, drugs, tobacco, alcohol, profanity, etc.

In these or other embodiments, a portion of the pixel data that corresponds to the identified particular content and that may be used by the display to present the particular content may be identified. In the present disclosure, the portion of pixel data that may correspond to the identified particular content may be referred to as "content-pixel data." In some embodiments, the content-pixel data may be modified and the screen image may be presented on the display based on the modified content-pixel data. The modification of the content-pixel data may be such that presentation of the particular content is obscured in the presentation of the screen image. For example, the particular content may be obscured in which the particular content may be out of focus, replaced with a blank space, replaced with one or more other images, etc. In the present disclosure, reference to "blocking" of content may include obscuration of content as disclosed.

The display level blocking operations described in the present disclosure may allow for the blocking of content in a manner that may not otherwise be available using other content blocking mechanisms. For example, content blocking is often performed at the browser level. However, sometimes web sites may be able to determine that a browser level content blocker activated (e.g., a browser level ad blocker) and may not allow users to access such sites with certain content blockers, such as ad-blockers activated. In contrast, a user may be able to access such websites with a display level content blocker activated because from the perspective of the website and the browser, the content that may be blocked at the display level may not be registered as being blocked. The above is merely one potential advantage of a display level content blocker and is not meant to be an exhaustive list of such advantages.

One or more example embodiments are explained with reference to the accompanying drawings.

FIG. 1 is a diagram illustrating an example system 100 that may be used to block a presentation of content on a display 108 of an electronic device. The system 100 may be arranged according to one or more embodiments, such as one or more of the example embodiments disclosed below. As detailed below, the system 100 may include a blocking module 102 configured to obtain pixel data 104 and configured to modify the pixel data 104 to generate modified pixel data 106 as detailed below.

The display 108 may be configured as one or more displays, such as a liquid crystal display (LCD), a light emitting diode (LED) display, an organic LED (OLED) display, a plasma display, a projection system, or other type of display. The display 108 may be configured to present video, text captions, user interfaces, and other data as directed. In some embodiments, the display 108 may be integrated with an electronic device. Additionally or alternatively, the display 108 may be separate from the electronic device.

The pixel data 104 may include any suitable type of data that may include information that may be used by the display 108 to present a screen image on the display 108. For example, in some embodiments, the pixel data 104 may include information (e.g., color, brightness, etc.) that may direct the emission of light by pixels of the display 108 to present the screen image on the display 108. For instance, the pixel data 104 may indicate which colors of a pixel to illuminate and an amount of illumination of the colors.

The blocking module 102 may be configured to perform one or more operations related to blocking presentation of content on the display 108. In some embodiments, the blocking module 102 may be implemented using software that includes code and routines configured to enable a computing system to perform operations. Additionally or alternatively, the blocking module 102 may be implemented using hardware including a processor, a microprocessor (e.g., to perform or control performance of one or more operations), a field-programmable gate array (FPGA), or an application-specific integrated circuit (ASIC). In some other instances, the blocking module 102 may be implemented using a combination of hardware and software. In the present disclosure, operations described as being performed by the blocking module 102 may include operations that the blocking module 102 may direct a computing system to perform. Additionally or alternatively, in some embodiments the blocking module 102 may be included in or part of a computing system.

In some embodiments, the blocking module 102 may be configured to obtain the pixel data 104 and to identify particular content in the screen image based on the pixel data 104. The particular content may be identified as content to be blocked. For example, in some embodiments, the pixel data 104 may be analyzed to identify one or more characteristics of the screen image. In some embodiments, the characteristics that may be identified may indicate whether the screen image includes the particular content.

For example, the characteristics that may be identified may include a uniform resource locator (URL) that may be depicted in the screen image. Additionally, certain URLs may be associated with content that may be deemed objectionable. For instance, certain URLs may correspond to websites with many advertisements, websites with pornographic material, websites with violent material, websites with drug use, etc. As another example, the characteristics that may be identified may include words or images that may be depicted in the screen image because certain words or images may be deemed objectionable. Additionally or alternatively, the words or images may indicate content that may be deemed objectionable. For example, words such as "sponsored," "ad," or "advertisement" may indicate the presence of an advertisement.

In these or other embodiments, one or more characteristics of elements depicted in the screen image may be identified. The element characteristics may include a location, a font, a color, a positional relationship between two or more elements, etc. The element characteristics may be identified because certain element characteristics may correspond to content that may be deemed objectionable more than other element characteristics. For example, certain fonts, colors, locations, positional relationships, etc., may correspond to advertisements, violent content, pornographic content, etc., than others. Additionally, elements that have the same or similar characteristics as compared to elements that may not have the same or similar characteristics may indicate that those elements are together such that different types of content may be differentiated. For example, an advertisement may use certain font styles that may differ from the font styles of other content that may be depicted in the screen image. Therefore, words that are of the certain font styles and that have a relatively close positional relationship with respect to each other may be deemed as being part of the advertisement. Conversely, words that are not of the certain font styles or that may not have a relatively close positional relationship may be deemed as not being part of the advertisement.

In some embodiments, the blocking module 102 may be configured to determine whether the screen image includes the particular content based on machine learning that may recognize patterns or rules that may correspond to one or more particular types of content. In some instances, the patterns or rules may indicate patterns or rules of one or more of the above-referenced characteristics that may be found in the particular types of content.

For example, in some embodiments, machine learning may be applied to reference content examples that may include examples of content that may be deemed objectionable and examples of content that may not be deemed objectionable. In these or other embodiments, the reference content examples may include examples of screen images that include content that may be deemed objectionable and examples of screen images that may not include content that may be deemed objectionable. The machine learning as applied to the examples may be used to generate a feature vector that may categorize different types of content and characteristics that may be included in the reference content examples. In some embodiments, the feature vector may be configured to categorize the content and characteristics based on those that are associated with objectionable content and those that are not.

In some embodiments, a model or classifier that may differentiate between content deemed objectionable and content deemed not to be objectionable may be generated based on the feature vector. Additionally or alternatively, the model or classifier may identify content that may be objectionable or not objectionable in images such as screen images. For instance, in some embodiments, a machine learning algorithm such as a support vector machine (SVM) algorithm, a deep learning algorithm, or a random forest algorithm may be used to generate a classifier that may be used to identify particular types of content in screen images. In some embodiments, the blocking module 102 may be configured to obtain the classifier by generating the classifier. Additionally or alternatively, the blocking module 102 may be configured to obtain the classifier from one or more systems or modules that have already generated the classifier.

In some embodiments, the blocking module 102 may be configured to provide the pixel data 104 to the classifier and the classifier may be configured to output one or more classifications of content included in the screen image that corresponds to the pixel data 104. In these or other embodiments, the blocking module 102 may be configured to provide to the classifier the one or more characteristics that may be included in the screen image and identified from the pixel data 104 and the classifier may be configured to output one or more classifications of content included in the screen image based on the one or more characteristics. In these or other embodiments, the content that may be classified may include particular content that may be deemed objectionable.

In some embodiments, in response to identifying the particular content from the pixel data 104, the blocking module 102 may be configured to identify, as content-pixel data, a portion of the pixel data 104 that corresponds to the particular content. For example, the blocking module 102 may be configured to identify, as the content-pixel data, portions of the pixel data 104 that may be used to represent the particular content in the screen image.

The blocking module 102 may be configured to modify the identified content-pixel data. Additionally or alternatively, the blocking module 102 may be configured to modify the content-pixel data such that presentation of the particular content on the display 108 is obscured.

For example, the blocking module 102 may be configured to modify the content-pixel data such that the particular content may be out of focus, pixelated, or otherwise obscured in a manner that a user may be able to see that the particular content is present in the screen image while also being at least partially obscured. Additionally or alternatively, the blocking module 102 may be configured to modify the content-pixel data such that the particular content may be hidden. For instance, in some embodiments, the content-pixel data may be modified such that a blank space may be presented in the screen image in place of the particular content. Additionally or alternatively, the blank space may include a white space, a black space, or part of a background included in the screen image as if the particular content were transparent. In these or other embodiments, the content-pixel data may be modified such that the particular content may be replaced by one or more images.

In some embodiments, the one or more replacement images may be based on a "chameleon" feature that may be applied by the blocking module 102. For example, in some instances, the blocking module 102 maybe configured to obtain setting data that may represent at least part of a setting that may surround an electronic device that may include the display 108. For instance, the blocking module 102 may be configured to obtain image data of one or more images of the setting. In these or other embodiments, the blocking module 102 may be configured to modify the content-pixel data by replacing the data in the content-pixel data that may be used to present the particular content with the image data of the setting such that instead of the particular content being presented in the screen image, at least a portion of the setting may be presented in the screen image instead. In some embodiments, the portion of the setting that may be presented may be the portion of the setting that is behind the display 108 at the location of the particular content in the screen image.

In some embodiments, the blocking module 102 may be configured to identify an exit element of the particular content. For instance, the classifier may be configured to classify elements of the particular content that may correspond to the exit element and the blocking module 102 may be configured to obtain such classification from the classifier. Additionally or alternatively, the blocking module 102 may be configured to identify words or indicators associated with exit elements such as "quit," "exit," or an individual "x" located in a location commonly associated with exit elements (e.g., in a corner). The exit element may include any applicable interactive element that may be presented with the particular content and that, in response to being selected, may cause the particular content to be closed or otherwise removed from the screen image.

Additionally or alternatively, the blocking module 102 may be configured to modify the content-pixel data such that rather than being obscured, depiction of the identified exit element may be highlighted or a place of focus. For example, in some embodiments, the blocking module 102 may modify the content-pixel data such that all of the particular content except the exit element is at least partially obscured (e.g., out of focus, pixelated, replaced, etc.). In these or other embodiments, the blocking module 102 may modify the content-pixel data such that the identified exit element is a different color in a manner that attracts attention, such as a bright or fluorescent color.

In some embodiments, the blocking module 102 may be configured to generate the modified pixel data 106 as being the pixel data 104 with the modified content-pixel data included therewith. Additionally or alternatively, the blocking module 102 may cause the presentation of the screen image on the display 108 based on the modified pixel data 106. The presentation of the screen image based on the modified pixel data 106 may be such that the particular content is obscured in a manner such as described above. In some embodiments, the blocking module 102 may cause the presentation of the screen image on the display 108 based on the modified pixel data 106 by communicating the modified pixel data 106 to the display 108 such that the display presents the screen image according to the information included in the modified pixel data 106.

In some embodiments, the blocking module 102 may be configured to modify the modified pixel data 106 to change the obscuration of the particular content in the screen image. For example, in some embodiments, the blocking module 102 may be configured to identify that a cursor position is located over the obscured particular content as presented by the display 108. For example, in some embodiments, the blocking module 102 may be configured to recognize a cursor element based on image recognition machine learning that may identify pointers used as cursors, based on movement patterns associated with cursors as compared to movement patterns of other elements (e.g., as indicated by historical data and erratic movement patterns), etc. The blocking module 102 may be configured to determine the position of the recognized cursor element and identify whether the position is located over obscured content. Additionally or alternatively, the blocking module 102 may be configured to identify a touchscreen location that is being touched and may correlate that with a cursor position. In these or other embodiments, the blocking module 102 may be configured to identify whether the touched touchscreen location is at a location of blocked content.

In response to determining that the cursor position is located over the obscured particular content, in some embodiments, the blocking module 102 may modify at least a portion of the content-pixel data that may be in an area surrounding the cursor position to change the obscuration. In some embodiments, a change in the obscuration may include removing the obscuration or changing the obscuration from one type of obscuration to another type of obscuration. In the present disclosure, a cursor position may include a position of any suitable indicator that may be used to show the current position for user interaction on the display 108. Additionally or alternatively, a cursor position may include a position of user interaction. For example, a location of a touch on a touchscreen may be considered a cursor position in the present disclosure.

In some embodiments, the blocking module 102 may be configured to interface with one or more adjustment elements 110 of the display 108. The adjustment elements 110 may include any suitable software, hardware, or combination of software and hardware that may be used to adjust settings of the display. For example, the adjustment elements 110 may include display setting software that allows for changing one or more settings of the display 108. In these or other embodiments, the adjustment elements 110 may include one or more user interfaces (e.g., buttons, touch elements, touchscreen elements, etc.) that may allow a user to select a setting for the display 108.

In some embodiments, the adjustment elements 110 may allow for adjustment of content blocking. For example, the adjustment elements 110 may be configured to allow a user to turn display level content blocking on and off, select a type of obscuration to be used in the content blocking, select types of content that may be blocked, select highlighting of exit elements, select what may happen when blocked content is selected, select what may happen when a cursor position is over the blocked content, or any other applicable selection. The blocking module 102 may be configured to interact with the adjustment elements 110 such that the blocking module 102 may implement the content blocking according to content blocking settings that may be selected in the adjustment elements 110.

In these or other embodiments, the blocking module 102 may be configured to interface with the adjustment elements 110 to dynamically modify what may or may not be deemed content to block. For example, in some embodiments, at least a portion of the particular content may be unblocked in response to a cursor position being placed over the particular content. In some embodiments, the blocking module 102 may be configured to cause the adjustment elements to allow the user to indicate whether or not the user wants to continue blocking the content. In response to the user indicating to continue blocking the content, the blocked content may be used as an example of objectionable content to further adjust the classifier or other mechanism used to identify content to block.

Conversely, in response to the user indicating to discontinue blocking the content, the blocking module 102 may return the modified content-pixel data back to its unmodified state to discontinue blocking of the particular content. Additionally or alternatively, the now unblocked content may be used as an example of non-objectionable content to further adjust the classifier or other mechanism used to identify content to block.

Therefore, as discussed above, the blocking module 102 may be configured to perform display level blocking operations with respect to content that may be presented on a display. Modifications, additions, or omissions may be made to the system 100 without departing from the scope of the disclosure. For example, the designations of different elements in the manner described is meant to help explain concepts described herein and is not limiting. Further, the system 100 may include any number of other elements or may be implemented within other systems or contexts than those described. Additionally, the operations performed by the blocking module 102 may be performed on a continuous, semi-continuous, or regular basis with respect to obtaining and modifying pixel data as new pixel data is generated.

Figure 2:
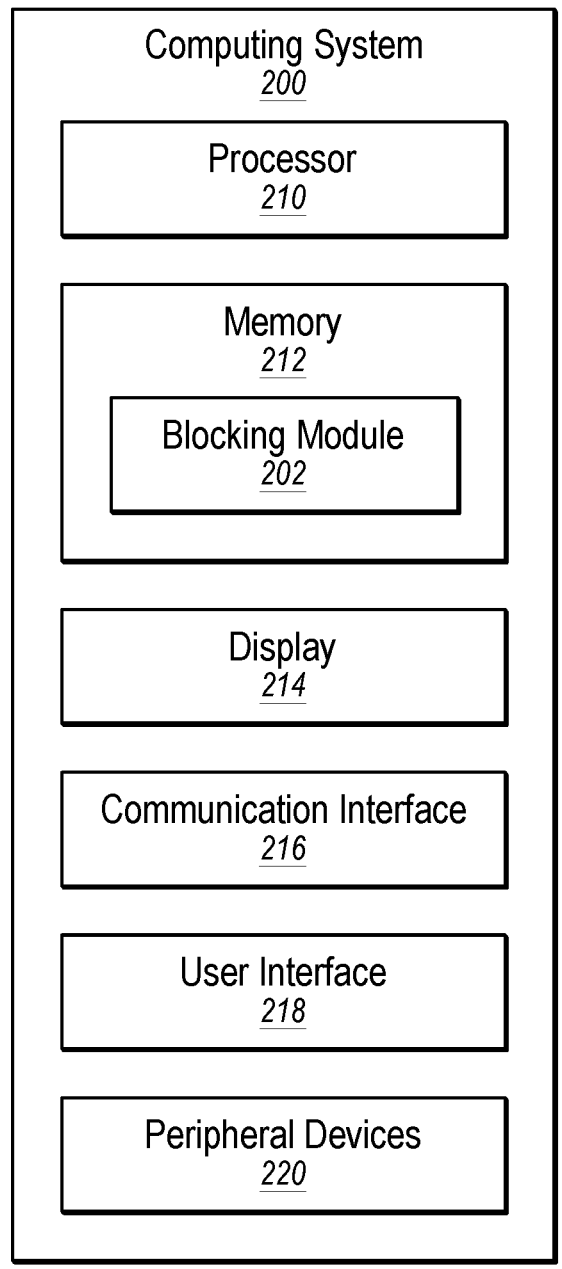
FIG. 2 illustrates an example computing system that may be used in a system configured to perform display level content blocking.

FIG. 2 illustrates an example computing system 200 ("system 200") that may be used in a system configured to perform display level content blocking. The system 200 may be arranged in accordance with at least one embodiment described in the present disclosure. The system 200 may include a processing unit 210, a memory 212, a display 214, a communication interface 216, a user interface unit 218, and one or more peripheral devices 220, which all may be communicatively coupled. In some embodiments, at least a portion of the system 200 may be part of any of the systems or devices described in this disclosure. For example, the system 200 may be included in or part of an electronic device or electronic system such as a smartphone, a tablet computer, a laptop computer, a desktop computer, a television, a computer monitor, a projector system, etc., or any suitable combination thereof.

Generally, the processing unit 210 may include any suitable special-purpose or general-purpose computer, computing entity, or processing device including various computer hardware or software modules and may be configured to execute instructions stored on any applicable computer-readable storage media. For example, the processing unit 210 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. In addition, the processing unit 210 may include one or more processing units included therein such as a multicore processor.

Further, the processing unit 210 may include any number of processing units distributed across any number of networks or physical locations that are configured to perform individually or collectively any number of operations described herein. In some embodiments, the processing unit 210 may interpret and/or execute program instructions and/or process data stored in the memory 212.

The processing unit 210 may be configured to execute the program instructions that may be stored or loaded into the memory 212. In these and other embodiments, a blocking module 202 that may be similar to or the same as the blocking module 102 of FIG. 1 may be stored in the memory 212 and program instructions of the blocking module 202 may be loaded and executed by the processing unit 210 to perform operations with respect to performing display level blocking.

The memory 212 may include computer-readable storage media or one or more computer-readable storage media for carrying or having computer-executable instructions or data structures stored thereon. Such computer-readable storage media may include any available media that may be accessed by a general-purpose or special-purpose computer, such as the processing unit 210. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processing unit 210 to perform a certain operation or group of operations as described in this disclosure.

The communication interface 216 may include any component, device, system, or combination thereof that is configured to transmit or receive information over a network. In some embodiments, the communication interface 216 may communicate with other devices at other locations, the same location, or even other components within the same system. For example, the communication interface 216 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication interface 216 may permit data to be exchanged with a network and/or any other suitable devices or systems, such as those described in the present disclosure. For example, in some embodiments, pixel data that may be received by the blocking module 202 may be received over a network. Additionally or alternatively, the blocking module 202 may be included in another computing system and may be configured to communicate modified pixel data that may be received at the communication interface 216.

The display 214 may be the same as or similar to the display 108 of FIG. 1. The user interface unit 218 may include any device to allow a user to interface with the system 200. For example, the user interface unit 218 may include a mouse, a track pad, a keyboard, a button, a touchscreen, a remote control, a dongle, an electronic device communicatively coupled to the computing system 200 etc., among other devices. The user interface unit 218 may receive input from a user and provide the input to the processing unit 210.

The peripheral devices 220 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 200 or otherwise generated by the system 200.

Modifications, additions, or omissions may be made to the system 200 without departing from the scope of the present disclosure. For example, the system 200 may include more or fewer components than those explicitly illustrated and described.

Figure 3:
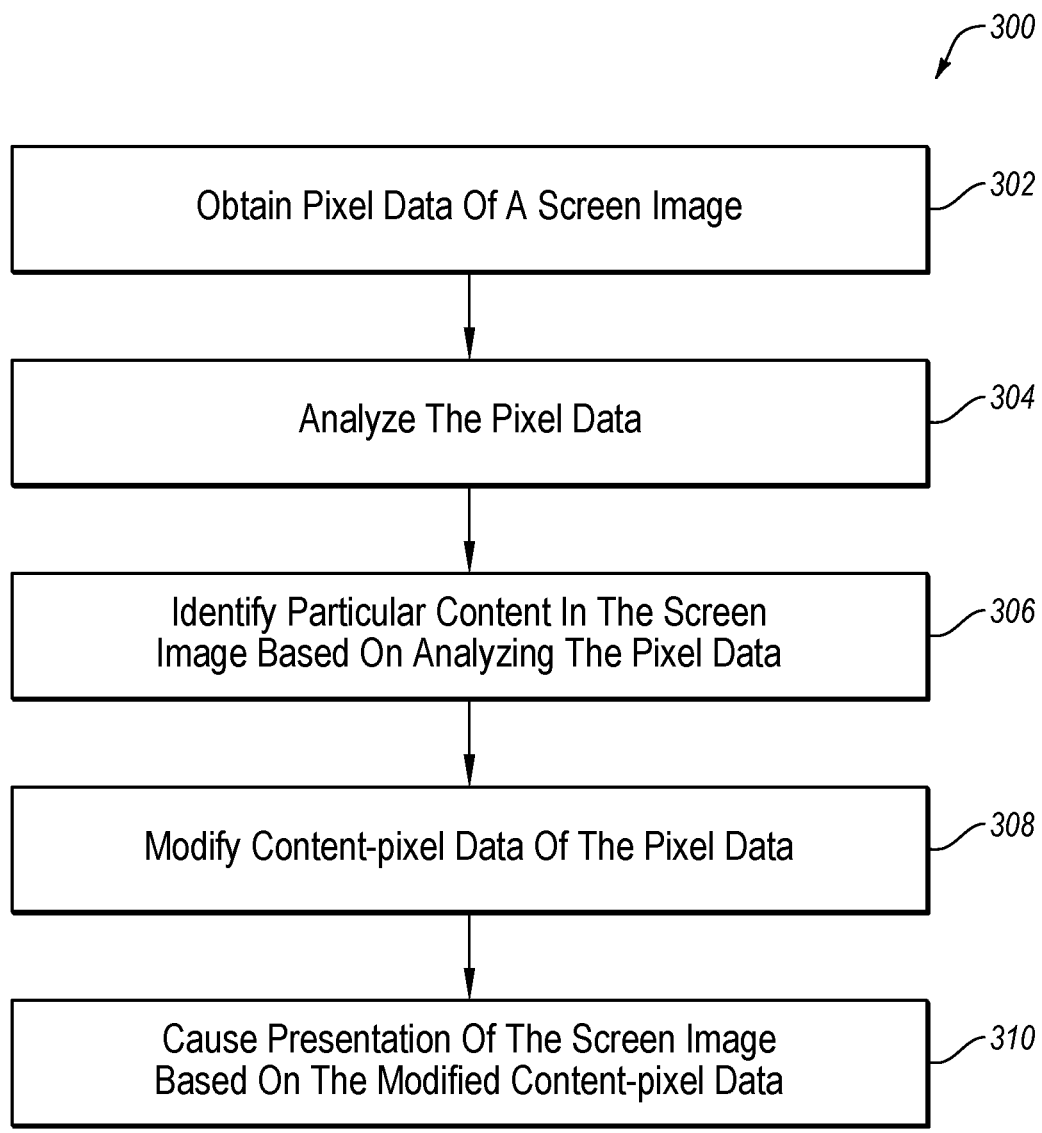
FIG. 3 is a flow diagram illustrating one embodiment of a process of display level content blocking.

FIG. 3 is a flow diagram illustrating one embodiment of a process 300 of display level content blocking. The process 300 may be arranged in accordance with at least one embodiment described herein. One or more operations of the process 300 may be performed by a system or device, such as the blocking modules 102 or 202 of FIGS. 1 and 2 or by the system 200 of FIG. 2. In these and other embodiments, one or more operations of the process 300 may be performed based on the execution of instructions stored on one or more non-transitory computer-readable media. Although illustrated as discrete blocks, various blocks of the process 300 may be divided into additional blocks, combined into fewer blocks, or eliminated, depending on the particular implementation.

At block 302, pixel data may be obtained. The pixel data may be of a screen image that is intended for presentation on a display of an electronic device. Additionally, the pixel data may be obtained before the screen image is presented on the display.

At block 304, particular content in the screen image may be identified based on the pixel data. In some embodiments, the particular content may be identified prior to the screen image being presented on the display. In some embodiments, the particular content may include content that may be deemed objectionable. For example, as indicated above, in some embodiments, the particular content may include advertisements, nudity, sexual content, violent content, gore, drugs, tobacco, alcohol, profanity, etc.

Additionally, in some embodiments, identifying the particular content may include identifying one or more characteristics of the screen image from the pixel data. As described above with respect to FIG. 1, the one or more characteristics may include a URL depicted in the screen image, a word depicted in the screen image, a location of each of one or more elements depicted in the screen image, a color of each of one or more elements depicted in the screen image, a font of each of one or more elements depicted in the screen image, an image depicted in the screen image, and a positional relationship between two or more elements depicted in the screen image.

Additionally or alternatively, the particular content may be identified based on machine learning in some instances. For example, in some instances the one or more characteristics may be provided as input to a classifier that may be generated based on multiple reference content examples being provided to one or more machine learning routines or algorithms. The classifier may be configured to generate, as output, a classification whether the screen image includes the particular content based on the one or more characteristics.

At block 306, content-pixel data may be identified. The content-pixel data may include a portion of the pixel data obtained at block 302 that may correspond to the particular content that may be identified at block 304. In some embodiments, the content-pixel data may be identified prior to the screen image being presented on the display. In some embodiments, the content-pixel data may be identified such as described above with respect to FIG. 1.

At block 308, the content-pixel data may be modified. In some embodiments, the content-pixel data may be modified prior to presenting the screen image on the display and to obscure presentation of the particular content in the screen image. For example, as described above, in some embodiments, the content-pixel data may be modified such that the particular content is presented as being out of focus, the particular content is presented as being pixelated, presentation of the particular content is replaced with a blank space, or presentation of the particular content is replaced with one or more images. In these or other embodiments, the content-pixel data may be modified to highlight a depiction of an exit element of the particular content such as described above with respect to FIG. 1.

At block 310, the screen image may be caused to be presented or presented on the display based on the modified content-pixel data. For example, in some embodiments, the display may be provided with the pixel data in with the modified content-pixel data included therewith. The display may be configured to present the screen image according to the received pixel data which may be modified in that it may include the modified content-pixel data. As indicated above, the presentation of the screen image based on the modified content-pixel data may be such that the particular content that corresponds to the modified content-pixel data may be obscured.

Modifications, additions, or omissions may be made to the process 300 without departing from the scope of the disclosure. For example, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments. In addition, the process 300 may include more operations. For example, in some embodiments, the process 300 may include operations related to modifying the modified content-pixel data such as described above with respect to FIG. 1. Additionally or alternatively, the process 300 may include operations related to allowing a user to continue or discontinue blocking the particular content. In these or other embodiments, the process 300 may include one or more operations related to generating the classifier. For example, in some embodiments, the process 300 may include one or more operations of FIG. 4, described below, related to generation of a classifier.

Figure 4:
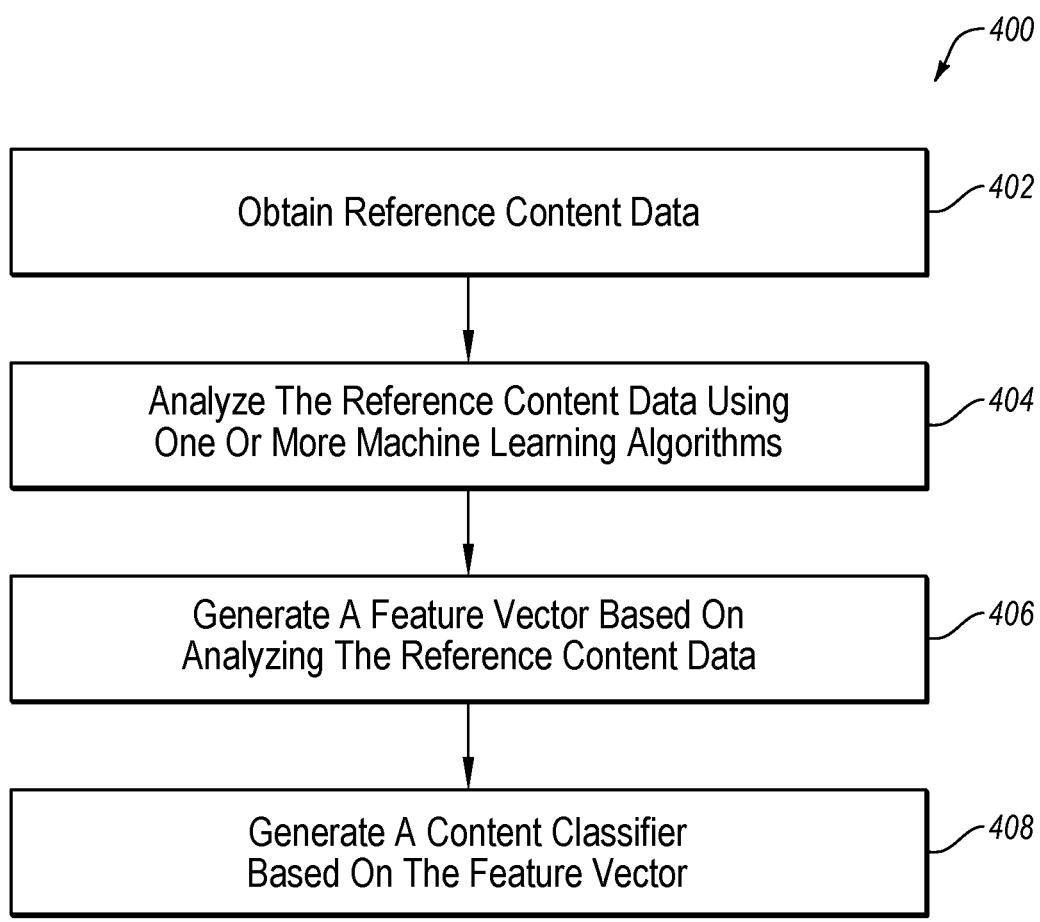
FIG. 4 is a flow diagram illustrating one embodiment of a process of generating a classifier that may be used with respect to display level content blocking.

FIG. 4 is a flow diagram illustrating one embodiment of a process 400 of generating a classifier that may be used with respect to display level content blocking. The process 400 may be arranged in accordance with at least one embodiment described herein. One or more operations of the process 400 may be performed by a system or device, such as the blocking modules 102 or 202 of FIGS. 1 and 2 or by the system 200 of FIG. 2. In these and other embodiments, one or more operations of the process 400 may be performed based on the execution of instructions stored on one or more non-transitory computer-readable media. Although illustrated as discrete blocks, various blocks of the process 400 may be divided into additional blocks, combined into fewer blocks, or eliminated, depending on the particular implementation.

At block 402, reference content data may be obtained. As indicated above, in some embodiments, the reference content data may include examples of content that may be deemed objectionable and examples of content that may not be deemed objectionable. In these or other embodiments, the reference content data may include examples of screen images that include content that may be deemed objectionable and examples of screen images that may not include content that may be deemed objectionable in which the objectionable and the non-objectionable content may be indicated as such. In some embodiments, the reference content data may include content that one or more users have identified as being objectionable or not objectionable. In some embodiments, the reference content data may include image data or pixel data of the reference content examples.

At block 404, the reference content data may be analyzed using any one or more machine learning algorithms. For example, in some embodiments, the machine learning algorithms may identify one or more characteristics of reference content examples that are classified as objectionable and one or more characteristics of content examples that are classified as not being objectionable may be identified. Additionally or alternatively, in some embodiments, the machine learning algorithms may be configured to compare the differently identified characteristics to differentiate between characteristics of content that may be objectionable and characteristics of content that may not be objectionable.

At block 406, a feature vector may be generated based on analyzing the reference content data. The feature vector may categorize different types of content and characteristics that may be included in the reference content data. In some embodiments, the feature vector may be configured to categorize the content and characteristics based on those that are associated with objectionable content and those that are not.

At block 408, a content classifier may be generated based on the feature vector. The content classifier may be configured to obtain content data such as pixel data or data indicating characteristics of content represented by the content data. Using the feature vector and different classifications included therein with respect to different characteristics and the characteristics of the content data, the classifier may be configured to classify the content of the content data. In some embodiments, the classifier may be configured to classify content as objectionable or not objectionable.

Modifications, additions, or omissions may be made to the process 400 without departing from the scope of the disclosure. For example, two or more operations may be performed in a different order than discussed. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments. In addition, the process 400 may include more operations. Moreover, the process 400 may include any number of different ways to generate a classifier outside of those specifically described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence of a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
   obtaining pixel data of a screen image intended for presentation on a display of an electronic device;
   prior to presenting the screen image on the display:
      identifying particular content in the screen image based on the pixel data;
      identifying, in the pixel data, content-pixel data that is a portion of the pixel data that corresponds to the identified particular content; and
      modifying the content-pixel data to obscure presentation of the particular content; and
   causing presentation of the screen image on the display based on the modified content-pixel data such that presentation of the particular content is obscured in the presentation of the screen image.

2. The method of claim 1, wherein modifying the content-pixel data is such that the presentation of the particular content is obscured according to one or more obscurations selected from a group of obscurations consisting of: presenting the particular content as being out of focus, presenting the particular content as being pixelated, replacing presentation of the particular content with a blank space, and replacing presentation of the particular content with one or more images.

3. The method of claim 1, wherein identifying the particular content includes, identifying, from the pixel data, one or more characteristics selected from a group of characteristics consisting of: a uniform resource locator (URL) depicted in the screen image, a word depicted in the screen image, a location of each of one or more elements depicted in the screen image, a color of each of one or more elements depicted in the screen image, a font of each of one or more elements depicted in the screen image, an image depicted in the screen image, and a positional relationship between two or more elements depicted in the screen image.

4. The method of claim 3, wherein identifying the particular content includes providing the one or more characteristics as input to a classifier configured to generate, as output, a classification whether the screen image includes the particular content based on the one or more characteristics, the classifier being generated using machine learning based on a plurality of reference content examples.

5. The method of claim 4, further comprising generating the classifier.

6. The method of claim 1, further comprising modifying the content-pixel data to highlight a depiction of an exit element of the particular content in which the exit element is an interactive element that, in response to being selected, causes the particular content to be removed from the screen image.

7. The method of claim 1, further comprising returning the modified content-pixel data to an unmodified state in response to a user indication to discontinue blocking the particular content.

8. The method of claim 1, further comprising modifying, in response to a cursor position being located over the obscured particular content, the modified content-pixel data to unobscure at least a portion of the particular content.

9. The method of claim 1, wherein the particular content includes one or more types of content selected from a group of content types consisting of: an advertisement, nudity, sexual content, violent content, gore, drugs, tobacco, alcohol, and profanity.

10. A system, comprising:
    a display;
    one or more computer-readable storage media including instructions stored thereon; and
    one or more processors communicatively coupled to the one or more computer-readable storage media and configured to, in response to execution of the instructions, cause the system to perform operations comprising:
       obtaining pixel data of a screen image intended for presentation on the display;
       prior to presenting the screen image on the display:
          providing the pixel data as input to a classifier configured to generate, as output, a classification whether the screen image includes particular content based on one or more characteristics of the screen image indicated in the pixel data, the classifier being generated using machine learning based on a plurality of reference content examples;
          identifying the particular content in the screen image based on the classification;
          identifying, in the pixel data, content-pixel data that is a portion of the pixel data that corresponds to the identified particular content; and
          modifying the content-pixel data to obscure presentation of the particular content; and
       causing presentation of the screen image on the display based on the modified content-pixel data such that presentation of the particular content is obscured in the presentation of the screen image.

11. The system of claim 10, wherein modifying the content-pixel data is such that the presentation of the particular content is obscured according to one or more obscurations selected from a group of obscurations consisting of: presenting the particular content as being out of focus, presenting the particular content as being pixelated, replacing presentation of the particular content with a blank space, and replacing presentation of the particular content with one or more images.

12. The system of claim 10, wherein the one or more characteristics are selected from a group of characteristics consisting of: a uniform resource locator (URL) depicted in the screen image, a word depicted in the screen image, a location of each of one or more elements depicted in the screen image, a color of each of one or more elements depicted in the screen image, a font of each of one or more elements depicted in the screen image, an image depicted in the screen image, and a positional relationship between two or more elements depicted in the screen image.

13. The system of claim 10, wherein providing the pixel data to the classifier includes providing the one or more characteristics as input to the classifier.

14. The system of claim 10, wherein the operations further comprise modifying the content-pixel data to highlight a depiction of an exit element of the particular content in which the exit element is an interactive element that, in response to being selected, causes the particular content to be removed from the screen image.

15. The system of claim 10, wherein the operations further comprise returning the modified content-pixel data to an unmodified state in response to a user indication to discontinue blocking the particular content.

16. The system of claim 10, wherein the operations further comprise modifying, in response to a cursor position being located over the obscured particular content, the modified content-pixel data to unobscure at least a portion of the particular content.

17. One or more computer-readable storage media including instructions stored thereon, that in response to execution by one or more processors, cause performance of operations comprising:
   obtaining pixel data of a screen image intended for presentation on a display of an electronic device;
   prior to presenting the screen image on the display:
      identifying particular content in the screen image based on the pixel data, the particular content including one or more types of content selected from a group of content types consisting of: an advertisement, nudity, sexual content, violent content, gore, drugs, tobacco, alcohol, and profanity;
      identifying, in the pixel data, content-pixel data that is a portion of the pixel data that corresponds to the identified particular content; and
      modifying the content-pixel data to obscure presentation of the particular content; and
   causing presentation of the screen image on the display based on the modified content-pixel data such that presentation of the particular content is obscured in the presentation of the screen image.

18. The one or more computer-readable storage media of claim 17, wherein modifying the content-pixel data is such that the presentation of the particular content is obscured according to one or more obscurations selected from a group of obscurations consisting of: presenting the particular content as being out of focus, presenting the particular content as being pixelated, replacing presentation of the particular content with a blank space, and replacing presentation of the particular content with one or more images.

19. The one or more computer-readable storage media of claim 17, wherein identifying the particular content includes, identifying, from the pixel data, one or more characteristics selected from a group of characteristics consisting of: a uniform resource locator (URL) depicted in the screen image, a word depicted in the screen image, a location of each of one or more elements depicted in the screen image, a color of each of one or more elements depicted in the screen image, a font of each of one or more elements depicted in the screen image, an image depicted in the screen image, and a positional relationship between two or more elements depicted in the screen image.

20. The one or more computer-readable storage media of claim 17, wherein the operations further comprise returning the modified content-pixel data to an unmodified state in response to a user indication to discontinue blocking the particular content.

* * * * *